Patented Aug. 7, 1945

2,381,388

UNITED STATES PATENT OFFICE 2,381,388

COMPOSITION OF MATTER

William E. Tann, Akron, Ohio, assignor to The Firestone Tire & Rubber Company, Akron, Ohio, a corporation of Ohio No Drawing. Application September 10, 1942, Serial No. 457,878

3 Claims. (Cl. 260—32)

This invention relates to compositions of synthetic rubber-like material made by interpolymerizing a mixture of a diolefin such as butadiene and/or its homologues with certain polymerizable vinyl compounds, namely those of the general formula

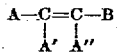

wherein A, A' and A'' are hydrogen atoms or alkyl radicals, and B is a negative radical such as cyano, acyl, carbalkoxy, phenyl or alkyl-substituted phenyl radicals.

The above synthetic rubber-like materials may in general be used in place of natural rubber in the rubber and plastics arts. They are in some respects superior to natural rubber. Thus, these synthetic materials are usually more resistant to oxidation than natural rubber and are relatively less adversely affected by sunlight. Many of these materials are also resistant to oils, especially to petroleum products. Those materials which are especially resistant to oils are not readily soluble in ordinary rubber solvents, such as gasoline, and no class of compounds has previously been found to act as satisfactory solvents for the above general class of synthetic materials.

It is, therefore, an object of the present invention to provide a new composition of matter comprising a member of the above class of synthetic rubber-like materials.

Another object is to provide efficient solvents and plasticizers for the said rubber-like materials.

A further object is to provide a new composition of matter suitable for use as a coating composition for another substance, and especially for natural rubber.

The above and further objects will be manifest in the detailed description of the invention which follows.

It has now been found that the synthetic rubber-like materials, above identified, may be readily dissolved by an organic ester of the general formula, RCOOR', wherein R is a hydrogen atom, an alkyl radical or an aryl radical and R' is an alkyl or a substituted alkyl radical. Preferably, the radicals represented by R and R' contain no more than ten carbon atoms each. Examples of the preferred esters comprise butyl formate, ethyl butyrate, butyl acetate, ethylene glycol monomethyl ether acetate, ethylene glycol mono-ethyl ether acetate, a hexyl acetate, such as methyl amyl acetate, benzyl acetate, butyl benzoate, triethylene glycol di-2-ethyl butyrate, octyl acetate, diethylene glycol mono-ethyl ether acetate and diethylene glycol mono-butyl ether acetate.

A member of the above class of rubber-like materials may be dissolved or dispersed in a preferred ester to produce a solution or dispersion suitable for use as an adhesive, impregnating or coating composition. A preferred ester, especially one of low volatility, may also be mixed with one of the synthetic rubbers to plasticize the same. Such plasticizer may be mixed with the rubber-like material in a conventional rubber mill or mixing apparatus, or the plasticizer may be added to a solution or dispersion, either solvent or aqueous, of the material in a known manner.

The following examples, in which parts are by weight, are illustrative of the invention:

Example 1

A synthetic rubber composition of the following formula is mixed on a conventional rubber mill:

| | Parts |
|---|---|
| Synthetic rubber-like material made by interpolymerizing 70 parts of butadiene and 30 parts of styrene in alkaline aqueous emulsion | 58 |
| Carbon black | 30 |
| Stearic acid | 2 |
| Triethylene glycol di-2-ethyl butyrate | 2.5 |
| Antioxidant | 1 |
| Accelerator | 1 |
| Zinc oxide | 4 |
| Sulfur | 1.5 |
| | 100.00 |

The plasticity of the synthetic rubber is found to be substantially increased on addition of the above-named butyrate, and the composition is smooth and homogeneous at the end of the mixing operation. The resulting vulcanizable composition is suitable for use as the tread portion of a synthetic rubber tire.

The synthetic rubber-like material made by interpolymerizing 70 parts of butadiene and 30 parts of alpha methyl styrene may be substituted in the above formula with equivalent results. Likewise, a synthetic rubber-like material made by interpolymerizing 68 parts of butadiene and 32 parts of ortho ethyl styrene may be substituted in the above formula to produce a satisfactory synthetic rubber composition.

Example 2

A synthetic rubber composition, suitable for lining gasoline hose, is prepared by mixing the following formula:

| | Parts |
|---|---|
| Synthetic rubber-like material made by interpolymerizing 75 parts of butadiene and 25 parts of acrylonitrile in alkaline aqueous emulsion | 65 |
| Soft carbon black ("P-33") | 24 |
| Stearic acid | 0.5 |
| Octyl acetate | 1.5 |
| Magnesium oxide | 3 |
| Antioxidant | 1 |
| Accelerator | 1 |
| Zinc oxide | 3 |
| Sulfur | 1 |
| | 100.0 |

Example 3

The following synthetic rubber composition is mixed:

| | Parts |
|---|---|
| Synthetic rubber-like material made by interpolymerizing 65 parts of butadiene and 35 parts of methyl methacrylate in acid aqueous emulsion | 60 |
| Carbon black | 25 |
| Stearic acid | 0.7 |
| Diethylene glycol mono-butyl ether acetate | 2.5 |
| Ester gum | 5 |
| Antioxidant | 1 |
| Accelerator | 0.8 |
| Zinc oxide | 4 |
| Sulfur | 1 |
| | 100.0 |

The above composition, in the form of relatively thin sheets, is placed in about four parts of butyl formate and allowed to swell therein. A smooth dispersion is produced on stirring. The dispersion may be thinned to a smooth paint by mixing it with three to five parts of butyl formate, ethyl acetate or a mixture of esters. The synthetic rubber paint is adhesive to many surfaces including surfaces of natural rubber, polyisobutylene, and a copolymer of butadiene and isobutylene. When applied to the sidewall of a natural rubber tire, for example, the paint leaves a glossy black film of the synthetic rubber compound which slowly cures in the air and adheres strongly to the tire to protect it from the deleterious effects of light and air. The paint may be applied to the tread grooves of a tire to leave a protective coating therein for resisting the action of oil or grease with which the tire may come in contact during service. The paint is also useful for protecting other rubber articles subject to light or oil.

Instead of thinning the above initial butyl formate dispersion with further quantities of an ester or mixture of esters, a paint may be produced by thinning the initial dispersion with gasoline or a similar petroleum hydrocarbon solvent. A smooth, stable paint is thereby produced, in spite of the fact that the above synthetic rubber cannot be satisfactorily dispersed in gasoline alone. An example of this type of cement, which is of low flammability, is made by mixing two parts of a 20 per cent dispersion of the synthetic rubber compound of Example 2 in butyl formate with one part of gasoline and one part of carbon tetrachloride (or ethylene dichloride or trichloro-ethylene). Dilution of such initial ester cement with larger quantities of gasoline and/or chlorinated hydrocarbon solvents produces a mixture which is satisfactory if used immediately, but which may separate into layers on standing.

A paint having similar properties is produced by substituting for the above synthetic rubber a synthetic rubber-like material made by interpolymerizing 70 parts of butadiene and 30 parts of methyl vinyl ketone in acid aqueous emulsion or a synthetic rubber-like material made by interpolymerizing 60 parts of butadiene and 40 parts of acrylonitrile in alkaline aqueous emulsion.

A cement of a synthetic rubber-like material may be prepared in a similar manner and used for impregnating textile materials or paper, or used as an adhesive cement in fabricating a synthetic rubber tire, for example.

Modification may be resorted to and obvious equivalents substituted for the specific ingredients set out in the above disclosure without departing from the scope and spirit of the invention.

I claim:

1. A cement comprising butyl formate, and a synthetic rubber-like material made by interpolymerizing a mixture including butadiene and acrylonitrile.

2. A cement comprising butyl formate, a petroleum hydrocarbon solvent, and a synthetic rubber-like material made by interpolymerizing a mixture including butadiene and acrylonitrile.

3. A liquid composition comprising butyl formate, gasoline, carbon black and a synthetic rubber-like material made by interpolymerizing a mixture including butadiene and acrylonitrile.

WILLIAM E. TANN.

---

CERTIFICATE OF CORRECTION.

Patent No. 2,381,388. August 7, 1945.

WILLIAM E. TANN.

It is hereby certified that error appears in the printed specification of the above numbered patent requiring correction as follows: Page 2, second column, line 51, claim 3, after the word "liquid" insert --coating--; and that the said Letters Patent should be read with this correction therein that the same may conform to the record of the case in the Patent Office.

Signed and sealed this 1st day of January, A. D. 1946.

(Seal)

Leslie Frazer

First Assistant Commissioner of Patents.

lining gasoline hose, is prepared by mixing the following formula:

| | Parts |
|---|---|
| Synthetic rubber-like material made by interpolymerizing 75 parts of butadiene and 25 parts of acrylonitrile in alkaline aqueous emulsion | 65 |
| Soft carbon black ("P-33") | 24 |
| Stearic acid | 0.5 |
| Octyl acetate | 1.5 |
| Magnesium oxide | 3 |
| Antioxidant | 1 |
| Accelerator | 1 |
| Zinc oxide | 3 |
| Sulfur | 1 |
| | 100.0 |

Example 3

The following synthetic rubber composition is mixed:

| | Parts |
|---|---|
| Synthetic rubber-like material made by interpolymerizing 65 parts of butadiene and 35 parts of methyl methacrylate in acid aqueous emulsion | 60 |
| Carbon black | 25 |
| Stearic acid | 0.7 |
| Diethylene glycol mono-butyl ether acetate | 2.5 |
| Ester gum | 5 |
| Antioxidant | 1 |
| Accelerator | 0.8 |
| Zinc oxide | 4 |
| Sulfur | 1 |
| | 100.0 |

The above composition, in the form of relatively thin sheets, is placed in about four parts of butyl formate and allowed to swell therein. A smooth dispersion is produced on stirring. The dispersion may be thinned to a smooth paint by mixing it with three to five parts of butyl formate, ethyl acetate or a mixture of esters. The synthetic rubber paint is adhesive to many surfaces including surfaces of natural rubber, polyisobutylene, and a copolymer of butadiene and isobutylene. When applied to the sidewall of a natural rubber tire, for example, the paint leaves a glossy black film of the synthetic rubber compound which slowly cures in the air and adheres strongly to the tire to protect it from the deleterious effects of light and air. The paint may be applied to the tread grooves of a tire to leave a protective coating therein for resisting the action of oil or grease with which the tire may come in contact during service. The paint is also useful for protecting other rubber articles subject to light or oil.

Instead of thinning the above initial butyl formate dispersion with further quantities of an ester or mixture of esters, a paint may be produced by thinning the initial dispersion with gasoline or a similar petroleum hydrocarbon solvent. A smooth, stable paint is thereby produced, in spite of the fact that the above synthetic rubber cannot be satisfactorily dispersed in gasoline alone. An example of this type of cement, which is of low flammability, is made by mixing two parts of a 20 per cent dispersion of the synthetic rubber compound of Example 2 in butyl formate with one part of gasoline and one part of carbon tetrachloride (or ethylene dichloride or trichloro-ethylene). Dilution of such initial ester cement with larger quantities of gasoline and/or chlorinated hydrocarbon solvents produces a mixture which is satisfactory if used immediately, but which may separate into layers on standing.

A paint having similar properties is produced by substituting for the above synthetic rubber a synthetic rubber-like material made by interpolymerizing 70 parts of butadiene and 30 parts of methyl vinyl ketone in acid aqueous emulsion or a synthetic rubber-like material made by interpolymerizing 60 parts of butadiene and 40 parts of acrylonitrile in alkaline aqueous emulsion.

A cement of a synthetic rubber-like material may be prepared in a similar manner and used for impregnating textile materials or paper, or used as an adhesive cement in fabricating a synthetic rubber tire, for example.

Modification may be resorted to and obvious equivalents substituted for the specific ingredients set out in the above disclosure without departing from the scope and spirit of the invention.

I claim:

1. A cement comprising butyl formate, and a synthetic rubber-like material made by interpolymerizing a mixture including butadiene and acrylonitrile.

2. A cement comprising butyl formate, a petroleum hydrocarbon solvent, and a synthetic rubber-like material made by interpolymerizing a mixture including butadiene and acrylonitrile.

3. A liquid composition comprising butyl formate, gasoline, carbon black and a synthetic rubber-like material made by interpolymerizing a mixture including butadiene and acrylonitrile.

WILLIAM E. TANN.

---

CERTIFICATE OF CORRECTION.

Patent No. 2,381,388.    August 7, 1945.

WILLIAM E. TANN.

It is hereby certified that error appears in the printed specification of the above numbered patent requiring correction as follows: Page 2, second column, line 51, claim 3, after the word "liquid" insert --coating--; and that the said Letters Patent should be read with this correction therein that the same may conform to the record of the case in the Patent Office.

Signed and sealed this 1st day of January, A. D. 1946.

(Seal)

Leslie Frazer

First Assistant Commissioner of Patents.